US012769872B2

(12) United States Patent
Jiang et al.

(10) Patent No.: US 12,769,872 B2
(45) Date of Patent: Oct. 20, 2026

(54) COMPOSITION IN RECYCLING DIFFERENTIAL PRIVACY

(71) Applicants: Lemon Inc., Grand Caymon (KY); Beijing Zitiao Network Technology Co., Ltd., Beijing (CN)

(72) Inventors: Bo Jiang, Culver City, CA (US); Jian Du, Culver City, CA (US); Sagar Sharma, Culver City, CA (US); Qiang Yan, Shanghai (CN)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 83 days.

(21) Appl. No.: 18/736,698

(22) Filed: Jun. 7, 2024

(65) Prior Publication Data

US 2025/0328683 A1 Oct. 23, 2025

Related U.S. Application Data

(63) Continuation of application No. PCT/CN2024/089202, filed on Apr. 22, 2024.

(51) Int. Cl.
*G06F 21/62* (2013.01)

(52) U.S. Cl.
CPC ................................ *G06F 21/6245* (2013.01)

(58) Field of Classification Search
CPC .................................................. G06F 21/6245
USPC ........................................................... 726/30
See application file for complete search history.

(56) References Cited

U.S. PATENT DOCUMENTS

2024/0386131 A1* 11/2024 Sharma ............... G06F 21/6245

FOREIGN PATENT DOCUMENTS

CN 110633285 A * 12/2019 ......... G06F 21/6245

OTHER PUBLICATIONS

Asoodeh et al., "Three Variants of Differential Privacy" Lossless conversion and applications, Jan. 23, 2021 (Year: 2021).*
International Search Report in International Appln. No. PCT/CN2024/089202, mailed on Sep. 30, 2024, 3 pages.
Jiang et al., "Budget Recycling Differential Privacy," CoRR, submitted on Mar. 2024, arXiv:2403.11445, 19 pages.
Wang et al., "Post-processing Private Synthetic Data for Improving Utility on Selected Measures," CoRR, submitted on May 2023, arXiv:2305.15538, 18 pages.

* cited by examiner

*Primary Examiner* — Jacob Lipman
(74) *Attorney, Agent, or Firm* — Fish & Richardson P.C.

(57) ABSTRACT

Methods, systems, and apparatus, including computer programs encoded on computer storage media, for differential privacy. One of the methods includes determining a privacy loss distribution for a budget recycling-differential privacy (BR-DP) framework for providing differential privacy to computed results; determining a privacy loss distribution for the BR-DP framework following T-fold composition of computed results on a same dataset; using the privacy loss distribution for the BR-DP framework following T-fold composition to determine a privacy leakage of the BR-DP framework under composition; and adjusting one or more privacy parameters based on the determined privacy leakage.

18 Claims, 9 Drawing Sheets

COMPOSITION IN RECYCLING DIFFERENTIAL PRIVACY

CLAIM OF PRIORITY

This application claims priority under 35 USC § 120 to the Patent Cooperation Treaty Patent Application Serial No. PCT/CN2024/089202 filed on Apr. 22, 2024, the entire contents of which are hereby incorporated by reference.

BACKGROUND

This specification relates to dataset computations and in particular to providing individualized data privacy in aggregated computation results.

Many online service providers collect user data, for example, when creating user accounts, or based on user interactions with the online service providers. These online service providers often use data for different purposes, for example, secure multiparty computation tasks. As such the utility of the data often needs to be balanced with privacy protections. One technique for providing robust privacy guarantees is to apply a differential privacy mechanism to the computed results, which can be used to protect individual privacy within datasets while maintaining the integrity of group-level statistics and insights.

SUMMARY

This specification describes a framework for recycling a portion of a differential privacy budget in a way that can increase data utility. In addition to the recycling framework, various parameters associated with differential privacy are evaluated and selected including utility measures, parameters for composition results, and sampling rates for large datasets.

Differential privacy is typically achieved by introducing randomness according to various techniques, e.g., adding a random noise value, into computed data results. The more randomness that is added, the more data utility may be adversely impacted. Alternatively, the less randomness introduced, the greater the possibility of data leakage. Data leakage indicates that some amount of individualized information can be determined from the aggregated data results.

The core parameter quantifying this trade-off is referred to as a privacy budget. The privacy budget measures a strictness of the data privacy guarantee provided by the differential privacy technique, which can also be understood as a maximum possible privacy leakage caused by the differential privacy technique. Consequently, a small privacy budget implies a stronger privacy guarantee with minimal leakage.

This specification describes a budget recycling framework that integrates differential privacy techniques with a budget recycling phase (BR-DP). A portion of an available privacy budget is allocated to a recycler that conditionally releases the differential privacy result based on an acceptability of the magnitude of the introduced randomness to the differential privacy result.

This specification further describes a utility indicator that identifies whether a noisy result output from the differential privacy mechanism satisfies a specified utility criterion. The use of the utility indicator can increase overall utility of released noisy results because noisy results that do not satisfy the threshold of the utility indicator can be discarded, e.g., by a recipient of the noisy result. Additionally, a privacy preserving mechanism can be applied to the utility indicator results.

This specification further describes techniques for measuring a privacy leakage under the BR-DP framework using a privacy loss distribution. Based on the ability to measure the privacy leakage, further techniques are provided for selecting privacy budgets allocated to the differential privacy mechanism and to the recycling mechanism. For example, privacy budgets can be selected based on a trade-off between utility and privacy.

This specification further describes techniques for evaluating privacy leakage of the BR-DP under composition. The composability of the BR-DP framework is determined using a corresponding privacy loss distribution. Additionally, based on the privacy loss distribution, a measure of the privacy leakage can be formulated with only linear complexity.

This specification further describes techniques for amplifying privacy using subsampling. This allows for the use of a larger effective privacy budget while maintaining a more stringent privacy requirement. The overall utility can be enhanced by using the subsampling. Additionally, techniques for determining a sampling rate for different types of queries are provided.

In general, one innovative aspect of the subject matter described in this specification can be embodied in methods that include the actions of, responsive to a computation result, generating a random noise value according to particular differential privacy parameters; generating a noisy result by combining the computation result with the generated random noise value; determining a utility indicator value based on a distance between the noisy result and the computation result; and releasing the noisy result along with the utility indicator value.

Other embodiments of this aspect include corresponding computer systems, apparatus, and computer programs recorded on one or more computer storage devices, each configured to perform the actions of the methods.

This specification uses the term “configured” in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

The subject matter described in this specification can be implemented in particular embodiments so as to realize one or more of the following advantages. Using budget recycling in combination with differential privacy (BR-DP) can enhance utility of the released results as compared with differential privacy mechanisms alone. The utility can be increased while ensuring the differential privacy guarantee under a fixed overall privacy budget. The recycling technique can be used with any suitable differential privacy mechanism.

The utility indicator can evaluate how much a noisy result diverges from a true result. The utility indicator allows for an increase in overall utility as compared to differential privacy mechanisms alone by removing at least some noisy results that do not satisfy an indicator threshold.

Privacy budget allocations to a DP kernel mechanism and to a recycler under the BR-DP can be determined. The optimization can ensure a specified differential privacy protection while enhancing utility as compared to differential privacy mechanisms without recycling and without relaxing the differential privacy requirements. For example, the recycling probability can be set to as high as possible while maintaining specified privacy constraints.

The system can determine a measure of privacy leakage of BR-DP framework under composition. BR-DP incurs less privacy leakage after composition than the DP mechanism alone. BR-DP can be combined with subsampling. A particular subsampling rate can be determined for different query types to increase the utility of each query type.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
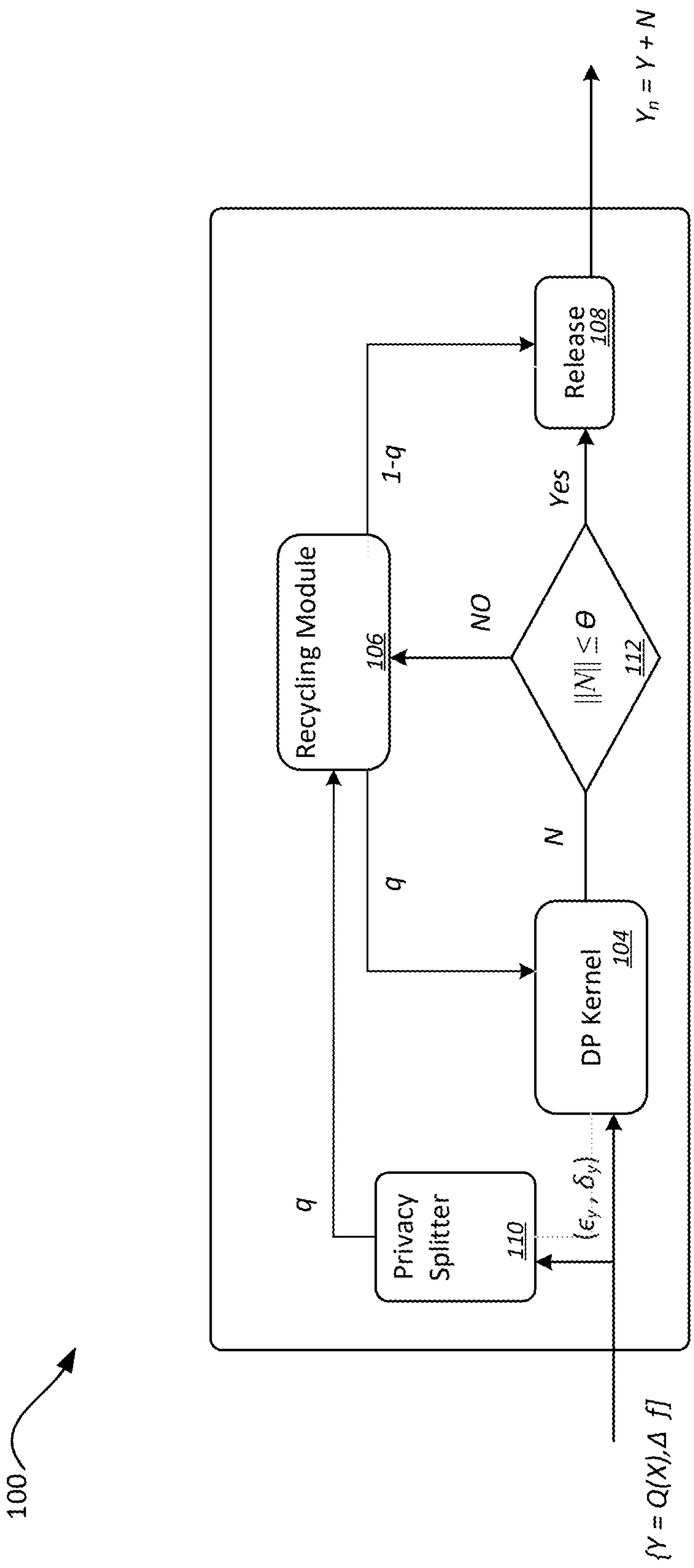
FIG. 1 shows an example illustrating a differential privacy with a budget recycling framework.

Differential privacy is a technique to reduce the probability of determining individualized private information from aggregated computation results on a dataset while maintaining a data utility of the result. Typically, this is done by introducing randomness to the aggregated result.

For example, a random noise can be added to the aggregated result based on some distribution so that there is plausible deniability as to the result's accuracy, meaning that no individualized determinations can be made. The amount of noise can be determined by privacy budget parameters including a privacy loss parameter $\in$ and a leakage probability parameter $\delta$. The privacy budget parameters determine the amount of noise that needs to be added to achieve a certain level of privacy.

The privacy loss parameter $\in$ measures the effect of each individual's information on the output of an analysis and typically has a value between zero and positive infinity. The privacy loss parameter $\in$ is used to tune the level of privacy protection required. This choice also affects the utility or accuracy that can be obtained from analysis of two neighboring datasets. A smaller value of $\in$ results in a smaller deviation and is therefore associated with strong privacy protection but less accuracy. For example, an $\in$ of zero means a very tight privacy guarantee and an $\in$ of infinity means there is no privacy guarantee. Thus, $\in$ cannot be too big or else there is no privacy provided, which may be mandated by policy or legal requirements. Conversely, if utility is too impacted by a small $\in$, computation result may have little value because the result are too noisy.

The leakage probability parameter $\delta$ controls the probability that a privacy breach event would happen and hence should be kept very small. The changes of privacy leakage might increase with the size of the dataset. As a result, in some implementations, the leakage probability parameter $\delta$ is selected to be less than the inverse of the size of the dataset.

While the introduction of random noise provides deniability for each individual to guarantee privacy protection, it can also result in a reduction in data utility. The data utility represents a measure of usefulness of the output result. Data utility can be quantified by measuring the deviation between the true aggregate output and the noise-infused aggregate output. Thus, there is a tradeoff between privacy and utility. The greater the privacy, the more the noise can impact utility and vice versa. Additionally, in particular applications the differential privacy mechanism might release out-of-bounds results that are unacceptable to users under small privacy budgets.

These "error bounds" are important in numerous real-world applications. For example, in real-world settings, these mechanisms might release out-of-bound results. For example, in scenarios requiring non negative aggregate results, outputs with noise added such that the aggregate noise-infused aggregate result is less than zero can be inherently invalid. In another scenario, measuring aggregate results involving a small user base, the acceptable range of noisy aggregate results may need to be narrow to provide meaningful user insights. In another example, when using A/B testing, noise-infused aggregate results that erroneously reverse the expected ordering can be considered unacceptable.

This specification describes a budget recycling-differential privacy framework (BR-DP). This framework integrates existing differential privacy mechanisms, such as the Laplace or Gaussian mechanism, with a budget recycling mechanism. Conceptually, the framework splits a portion of the total available privacy budget to a differential privacy mechanism to generate a noisy version of the target query. Concurrently, the remaining budget is allocated to the recycler, which conditionally releases the result based on the acceptability of the noise magnitude. When the noise magnitude exceeds the tolerable range, the recycler, governed by a probabilistic rule, either redirects the process to regenerate another noisy result or opts to release the current result despite its unacceptability. This iterative cycle continues until an acceptable noisy version of the result is produced. The BR-DP framework can provide the specified differential privacy guarantee, while providing a higher level of utility in the output results as compared to using differential privacy mechanisms alone.

This specification further describes techniques for providing a utility indicator to evaluate how much a noisy result diverges from a true result. Results that diverge from the true results by more than a threshold can be removed from use, e.g., by a recipient, thereby increasing utility. The indicator can further be privacy protected to avoid data leakage through knowledge about the indicator.

Techniques are further described for determining budget allocations in the BR-DP framework between the DP mechanism and the recycler. Additionally, the determination of budget allocations can be extended to composition scenarios. Furthermore, this specification describes techniques for increasing utility under the BR-DP framework using subsampling by identifying a particular sampling rate for different query types.

Budget Recycling-Differential Privacy Framework

FIG. 1 shows an example illustrating a (BR-DP) framework 100. The input to the BR-DP framework 100 is a computed result Y (102) prior to the application of differential privacy. The computed result Y is based on Q(X), which represents a particular query Q applied to a dataset X, and a measure of query sensitivity Δf. Query sensitivity refers to how much effect a change in the underlying dataset has on a query result. In other words, if the data of an individual is removed from the dataset, how much does the query result change. A noise N is introduced to the computed result Y to generate a final noisy result as output Yn=Y+N (103).

The BR-DP framework 100 includes a DP kernel 104. The DP kernel 104 adds the noise N to a generated result according to a particular differential privacy mechanism, for example, a Laplace or Gaussian mechanism that introduces the random noise into the result, for example, based on a corresponding noise distribution.

The DP kernel 104 is augmented by a recycling module 106. The recycling module 106 determines whether to release 108 the noisy result or recycles the noise by regenerating a new random noise N for the result Y by the DP kernel 104.

The BR-DP framework 100 operates in four distinct phases. A triggering phase is initiated by the query Q for a computed result Y. The triggering activates an initialization of parameters including privacy parameters (∈, δ) representing the total privacy budget, Δf, the type of noisy mechanism employed by the DP kernel 104 to generate the random noise, e.g., Gaussian or Laplacian, and θ, which defines the error boundaries of the noisy result.

During a budgeting phase, the total privacy budget is strategically divided by a privacy splitter 110. The division by the privacy splitter 110 provides a portion (∈y, δy) as allocated to the DP kernel 104 and a recycling probability, q, designated for the recycling module 106 such that collectively, the total combined privacy budget (∈, δ) is still satisfied.

During a releasing phase, the DP kernel 104 generates a noise distribution from which a random noise Nis sampled. The DP kernel 104 generates the noise based on the particular differential privacy mechanism and according to the allocated portion (∈y, δy) of the total privacy budget and based on Δf. The noise N is generated in accordance with a particular utility requirement, indicated by the error boundaries outside of which the noisy result fails to satisfy the utility requirement. The absolute value of the generated noise N is therefore compared 112 to the error boundary to determine whether ||N||≤θ. If ||N||≤0 the noisy result is within the error boundaries, it is appended to the true result Y and released 108 as Yn=Y+N. Conversely, if ||N||>θ the recycling module 106 determines whether the noisy result will be released or recycled.

During a recycling phase, the recycling module 106 determines whether to recycle the noisy result when ||N||>θ. The determination is based on the recycling probability q. Specifically, the probability q is the probability that both N and ∈y are recycled and therefore, the probability (1−q) corresponds to the probability that the noisy result is released 108 without modification even though N is greater than the error boundary. If the budget recycling module 106 determines to recycle the noisy result, the DP kernel 106 generates a new value of N for the result Y using the differential privacy mechanism. This noise value is again compared to the error boundary to determine whether to release a noisy result based on the new value of N or to again determine whether to recycle the noise. The process of recycling can iteratively repeat until a noisy version Yn is determined to be released, e.g., the iteratively generated value of N is less than or equal to the error boundary or the recycling probability is 1−q.

The probability q is a recycling parameter that indicates how bounded the differential privacy mechanism is to the error boundary. For example, a q=0 would mean that all noisy results are released, even if the error boundary is exceeded by the generated differential privacy noise value. This corresponds to a conventional differential privacy mechanism without budget recycling. At the other extreme, if q=1, results that exceed the boundary are never released, indicating a fully bounded differential privacy mechanism. However, a fully bounded differential privacy mechanism typically will not satisfy the (∈, δ) privacy parameters for some small values of δ. As a result, the use of the budget recycling with a probability between 0 and 1 can be regarded as a soft-bounded differential privacy mechanism that reduces the number of out of bounds noisy results that are released, which improves utility while maintaining differential privacy.

Figure 2B:
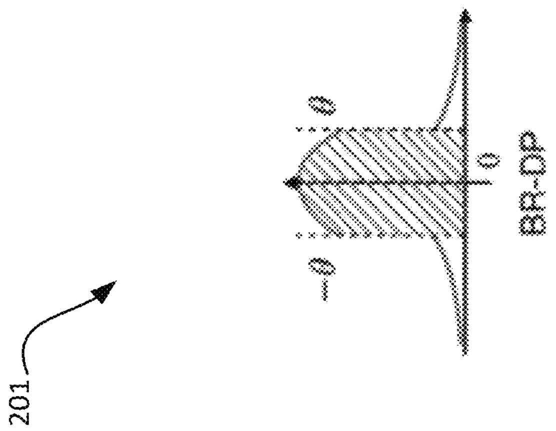
FIGS. 2A and 2B illustrate example noise distribution curves.
Figure 2A:
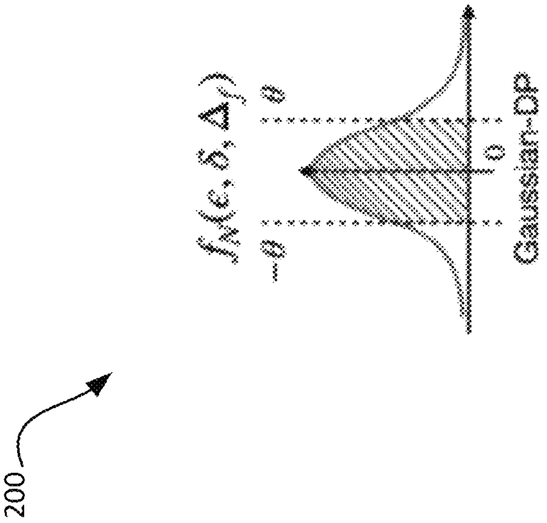

FIGS. 2A and 2B represent example noise distribution curves without budget recycling and with budget recycling.

FIG. 2A shows an example noise distribution 200 for given privacy budget (∈, δ) and query sensitivity Δf. The error bounds are represented on each side of the bell shaped Gaussian differential privacy noise distribution as by dashed lines at −θ and θ. The shaded area under the curve between the error boundaries indicates an area in which the introduced noise still provides for a level of utility in the noisy result that satisfies a threshold utility value. The tails of the noise distribution that are outside of the error boundaries, when selected, provide a noise value that impairs the utility of the computation result. However, without imposing any boundary conditions, some amount of randomly selected noise will lie in the tails of the distribution.

FIG. 2B shows an example noise distribution 201 in which the budget recycling differential privacy is employed. In particular, the error bounds are represented by dashed lines at −θ and θ, the same as in FIG. 2A. However, in the noise distribution 201, the budget recycling causes at least some percentage of noise values outside of the error boundaries to be recycled into noise values that are within the error boundaries. This results in a higher curve within the error boundaries and smaller tails outside of the error boundaries. Consequently, a higher number of noisy results are within the specified utility value, increasing the overall utility of the differential privacy with budget recycling employed while keeping the privacy budget the same.

Figure 3:
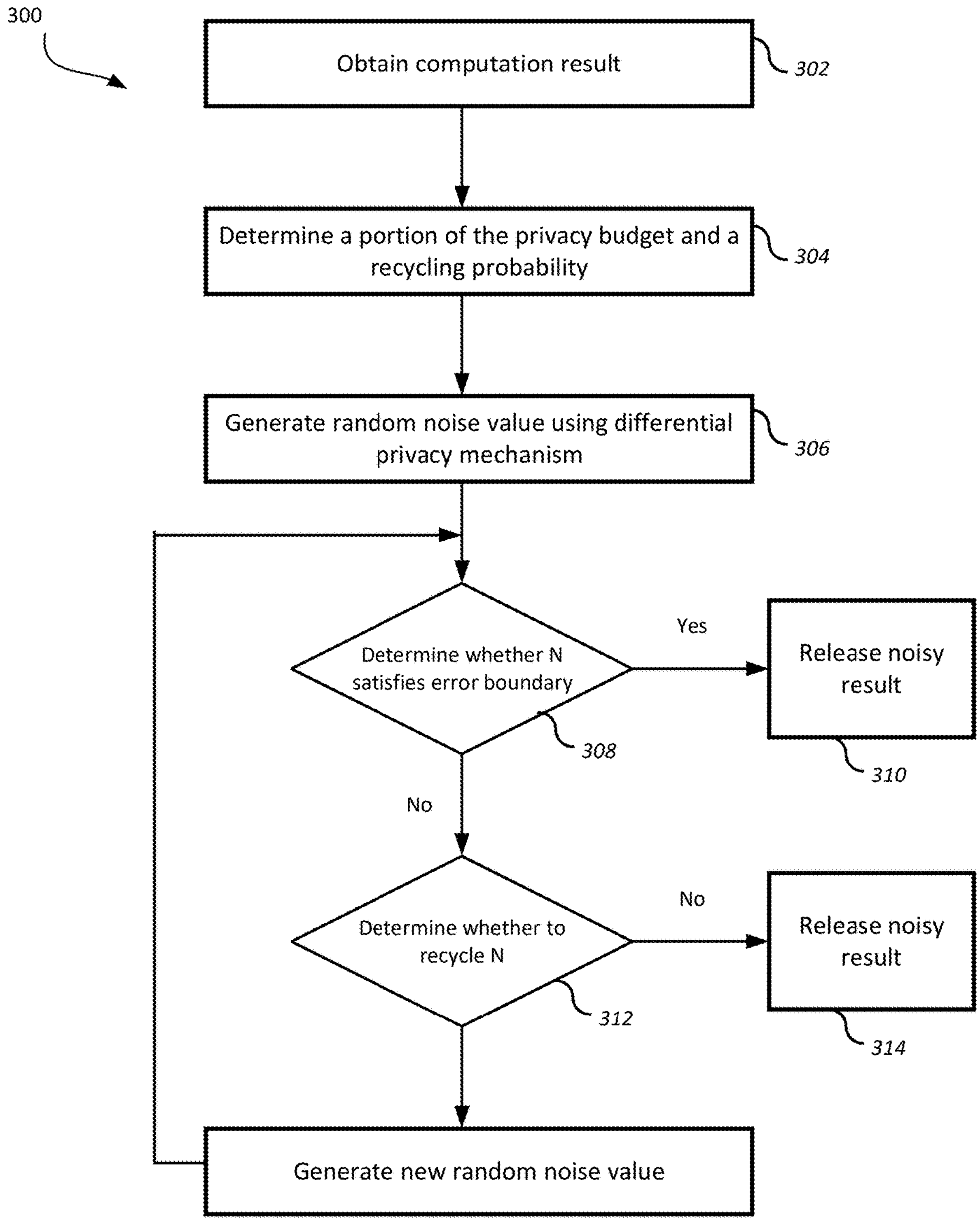
FIG. 3 is a flow diagram of an example process for budget recycling.

FIG. 3 is a flow diagram of a process 300 for budget recycling. For convenience, the process 300 will be described as being performed by a system of one or more computers, located in one or more locations, and programmed appropriately in accordance with this specification. For example, a system employing the BR-DP framework 100 of FIG. 1, appropriately programmed, can perform the process 300.

The system obtains a computation result responsive to some query (302). The computation result can be generated, for example, as part of multi-party computation that generates a result to a particular function on a dataset that is to be shared with another party without sharing any specifically identifiable information from the system's dataset.

The system determines a portion of the privacy budget and a recycling probability (304) such that the overall operation maintains the overall privacy budget. In particular, the overall privacy parameters are divided to provide a portion ($\in$y, $\delta$y) to the DP kernel and a particular recycling probability.

The system applies a differential privacy mechanism to generate a random noise value (306). The noise can be generated by sampling a particular noise distribution, for example, a Gaussian or Laplacian noise distribution. The noise is generated according to the determined portion of the privacy budget.

The system determines whether the random noise value satisfies an error boundary (308). The absolute value of the noise value can be compared to the value of the error boundary to determine whether the noise value exceeds the error boundary or is less than or equal to the error boundary.

In response to the comparison indicating that the random noise value satisfies the error boundary, the system adds the noise value to the computation result and releases the resulting noisy result (310).

In response to determining that the random noise value does not satisfy the error boundary, the system determines whether to recycle the noise value (312). The system uses the recycling probability to determine whether to recycle the noise value.

In response to determining that the noise value is not recycled, the noise value is added to the computation result and released (314).

In response to determining that the noise value is recycled, a new random noise value is generated, e.g., by sampling the noise distribution again, and compared to the error boundary (316).

The system again determines whether to release a noisy result or recycle the noisy value in the same manner as described in steps 308 to 316 until the system determines to release a particular noisy result (318).

Utility Evaluation Under Differential Privacy

As previously described, the utility of a result in which differential privacy has been applied represents a deviation between the true computation result Y and the noisy result Yn. When the deviation is too great, the loss of utility may make the result unusable to a recipient.

This section describes a utility indicator that serves to identify whether the output from the differential privacy mechanism satisfies a specified utility criterion. The use of the utility indicator can increase overall utility of generated noisy results as compared to differential privacy mechanisms alone. The utility indicator can also provide a variable privacy guarantee contingent on the indicator's status. For example, when the indicator signals a value of "1" indicating that the noisy result Yn closely approximates the true result value Y, differential privacy is upheld. Conversely, when the indicator signals "0" signifying an unacceptable deviation from the true result value Y, a more relaxed privacy guarantee can be employed to improve utility. This intuitively corresponds to the understanding that an output result is more privacy-sensitive when it closely aligns with the true result, and less privacy-sensitive when the noisy result significantly diverges from the true result.

In an example operation, a system generates a computation result Y, e.g., operating on a particular dataset X, in response to a query Q, represented as Y=Q(X). To provide privacy protection for the result Y, a differential privacy mechanism $\mathcal{M}$ can be applied to generate a random noise value that can be added to the true result Y to generate a noisy result Yn. The noisy result Yn satisfies the privacy budget parameters ($\in$, $\delta$) for providing differential privacy to the true result Y.

Based on this example, the definition of differential privacy for two datasets X and X' that differ by a single record can be represented as:

$$Pr(\mathcal{M}[Q(X) = y_{noise}]) \le e^{\epsilon_1} Pr(\mathcal{M}[Q(X') = y_{noise}]) + \delta_1 \quad \text{Equation (1)}$$

Where $y_{noise}$ is a realization of Yn. In practice, Yn can diverge greatly from Y, which makes the noisy result less useful. The differential privacy mechanism, e.g., executed by DP kernel such as DP kernel 104 of FIG. 1, can release an indicator I along with Yn showing the accuracy of the released data. Specifically, the released indicator can be a binary result:

$$I = \begin{cases} 1 & \text{if } D(Y, Y_n) \le \theta \\ 0 & \text{if otherwise} \end{cases}$$

Where D is a distance measure that can represent either an absolute distance or a relative distance. Different mathematical techniques can be used to measure the distance. The key objective is that if the distance is small, the noisy result is more likely to be useful. The value of θ represents the error boundary or threshold as described above. Thus, if the distance is less than the error bounds, the noisy result Yn is within the bounded error range of the true result Y. Additionally, since the value of the indicator provides some information about the nature of the true value Y, measures should be taken to preserve privacy in releasing the value of I.

In some implementations, a user queries a dataset to perform some data analysis operation. When the released data result is accurate, i.e., when D is less than or equal to θ, the data result can be labeled as usable. When the released data is inaccurate, the data result can be labeled as non-usable. The data result can be labeled as accurate when the relative error of RD(Y, Yn) is less than or equal to θ. Similarly, the data result can be labeled as inaccurate when the relative error RD(Y, Yn) of is greater than 9. RD(Y, Yn) can be represented as r for simplicity.

Because the recipient typically does not know if the noisy result released by the differential privacy mechanism is usable or not, e.g., within the error boundaries, there is a chance of using incorrect data that leads, for example, to inaccurate data analysis. This risk of inaccurate results negatively impacting utility is reflected by a utility cost value. Additionally, a cost of the usable data can be defined by a constant Cu multiplied by r. A cost of non-usable data is often large and can be denoted as a constant Cnon. Furthermore, the user can also deny the usability of an answer that the user believes deviates too much from the true value. The cost of discarding an answer is denoted as another constant Cdis. The user's decision on whether to discard Yn can be based on the value of the indicator I. For example, if I=1, the user can keep Yn, but if I=0, the user can discard Yn. A formal definition of utility as the total cost can be represented as:

$$\text{Cost} = \begin{cases} C_u r & \text{if } r \le \theta \text{ and } I_n = 1 \\ C_{non} & \text{if } r > \theta \text{ and } I_n = 1 \\ C_{dis} & \text{if } I_n = 0 \end{cases}$$

Depending on the value of $I_n$, the overall cost function can be written as:

Equation (2)

$$\text{Cost} = Pr(I_n = 0) \cdot C_{dis} + PR(I_n = 1)\left\{Pr(r > \vartheta \mid I_n = 1) \cdot C_{non} + \int_{r \le \theta} r \cdot C_u f(r \mid I_n = 1) dr\right\}$$

Figure 4:
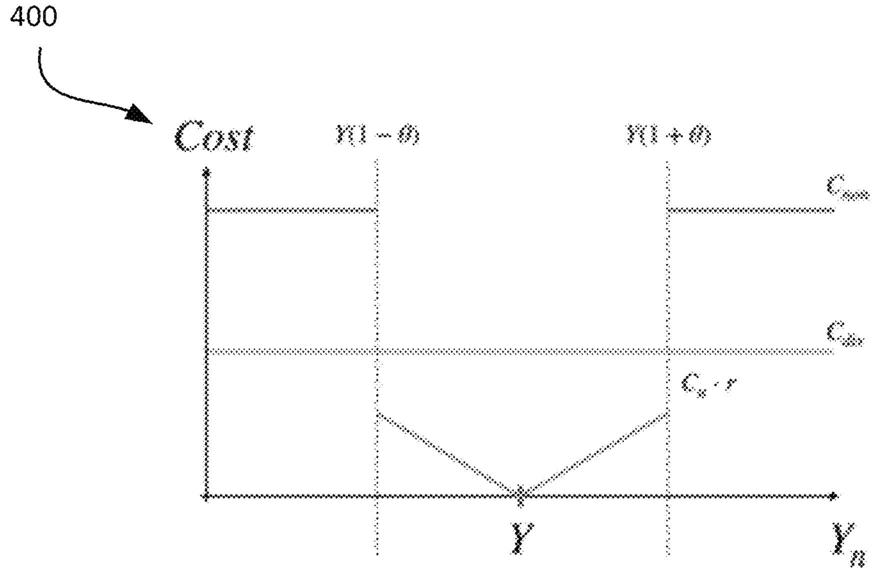
FIG. 4 is an example diagram illustrating a cost function for different scenarios.

FIG. 4 is an example diagram 400 illustrating the utility cost function for the three different cases. In particular, as illustrated in FIG. 4, each cost is illustrated relative to the true value Y based on noisy result Yn on the x-axis and the cost on the y-axis. The cost of the usable data is lowest, while the cost to the unusable data is the highest.

As mentioned above, since the indicator is based on the true value Y, releasing the value of I can potentially provide information about the true value Y. A mechanism can be employed for releasing the utility indicator that satisfies utility optimized local differential privacy ("ULDP"), which splits the input support into sensitive and non-sensitive inputs. For a binary input like the indicator, the mechanism parameters provide that a released indicator of 0 is always correct, but a released indicator of 1 may in reality be a 1 or 0.

Figure 5:
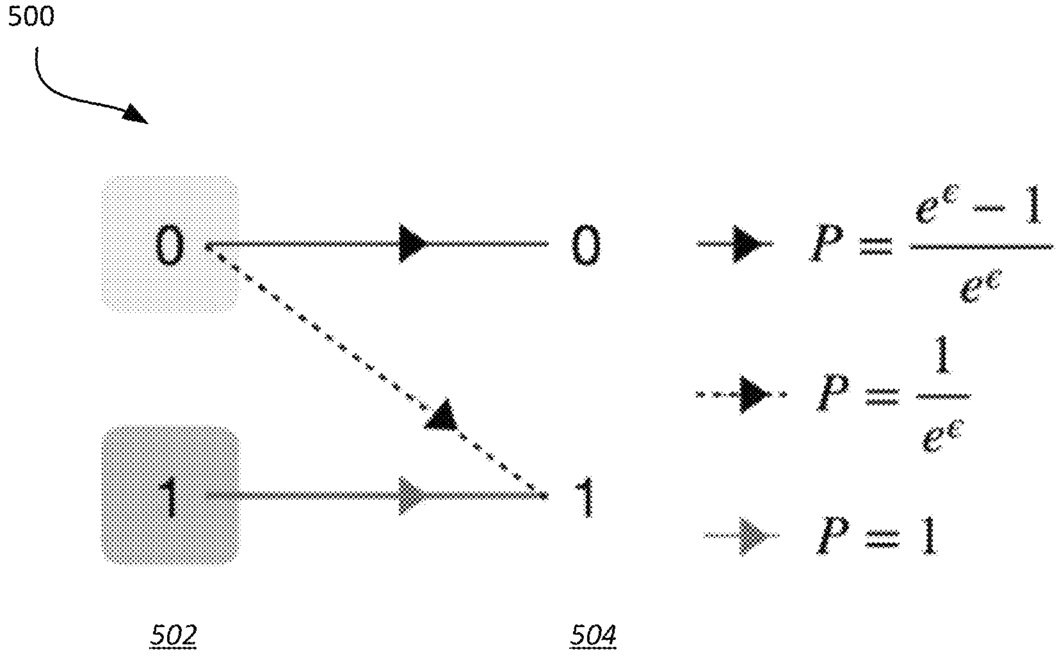
FIG. 5 is an example diagram illustrating a utility indicator release mechanism.

FIG. 5 illustrates a diagram 500 of the mechanism for releasing the indicator value. As shown in diagram 500, the true values 502 are then transformed into released values 504 according to particular probabilities such that the observed value 504 of 1 is not necessarily the true indicator value.

As illustrated by FIG. 5, when $I_n$=1, the release of the indicator contains some uncertainty as to whether the actual value of $I_n$ is 0 or 1. However, ULDP can be viewed as a relaxed form of differential privacy. In differential privacy the value of ∈ controls the tradeoff between utility and privacy. A privacy loss distribution ("PLD") is a way to capture the tradeoff between the privacy loss parameter ∈ and the failure probability represented by δ (i.e., that DP fails and data leakage occurs). So if ∈ is very small, that means very high utility, but it also means there is a larger chance that DP failure. However, if ∈ is large, then the failure chance is low, but utility is also low. The privacy loss distribution relates this distribution between ∈ and δ. Thus, using the privacy loss distribution provides an accounting for data leakage to determine whether the sufficiently satisfies the differential privacy. Thus, a formal way to account for potential differential privacy leakage is through a privacy loss distribution (PLD). Therefore, the mechanism for releasing the indicator can be represented as:

$$\frac{Pr(\mathcal{M}(1) = 1)}{Pr(\mathcal{M}(0) = 1)} = e^{\epsilon_1} \quad \text{Equation (3)}$$

In terms of a privacy loss distribution, the mechanism can be rewritten as:

$$Pr(L = \epsilon) = 1 \quad \text{Equation (4)}$$

For an arbitrarily PLD of a differential privacy mechanism used under a BR-DP framework to release a noisy result Yn, the composition of the two mechanism is equivalent to the convulsion of the two PLDs, which is equivalent to the privacy budget of the original differential privacy mechanism plus $\in_I$, in other words $\in_y + \in_I$.

When $I_n$=0, it is always true that $I_n$=0, and the privacy guarantee no longer satisfies differential privacy. However, when $I_n$=0, the released Yn significantly diverges from the true value of Y, which makes the release not privacy sensitive.

The use of the indicator can increase overall utility compared to differential privacy mechanisms alone because non-usable results can be discarded while maintaining differential privacy when the indicator is 1. Although differential privacy is not upheld when the indicator is 0, the high deviation of the corresponding noisy result is not harmful.

Figure 6:
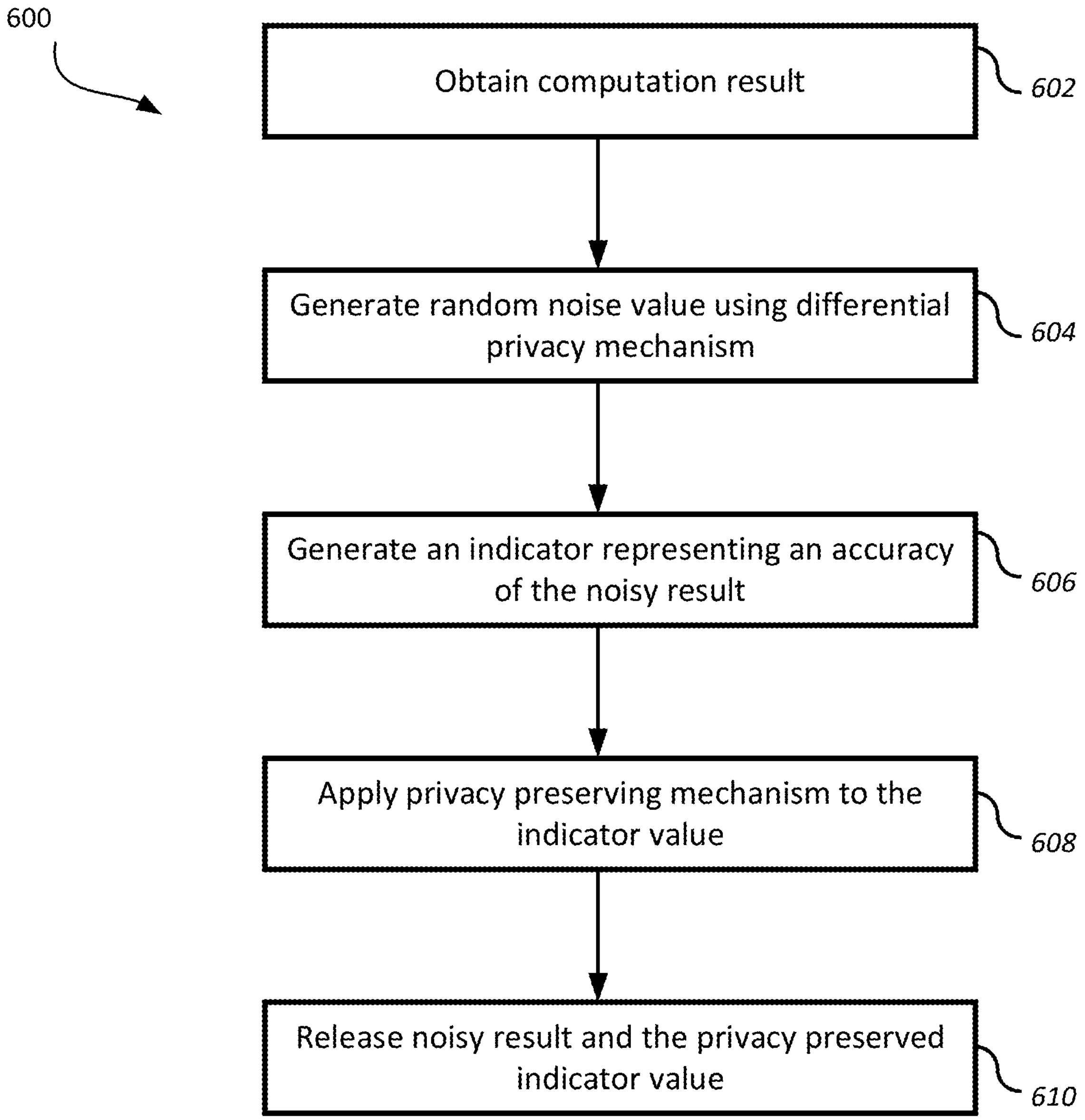
FIG. 6 is a flow diagram of an example process for using a utility indicator.

FIG. 6 is a flow diagram of an example process 600 for using a utility indicator. For convenience, the process 600 will be described as being performed by a system of one or more computers, located in one or more locations, and programmed appropriately in accordance with this specification. For example, a system employing the BR-DP framework 100 of FIG. 1, appropriately programmed, can perform the process 600.

The system obtains a computation result (602). In an example operation, a system generates a computation result Y, e.g., operating on a particular dataset X, in response to a query Q.

The system generates a random noise value using a differential privacy mechanism (604). The differential privacy mechanism M can be applied to generate a random noise value that can be added to the true result Y to generate a noisy result Yn. The noise can be generated by sampling a particular noise distribution, for example, a Gaussian or Laplacian noise distribution. When applied to the BR-DP framework, the noise is generated according to the determined portion of the overall privacy budget.

The system generates an indicator representing an accuracy of the noisy result generated using the differential privacy mechanism (606). In some implementations, the indicator is a binary indicator having a value of 1 when the distance between the true computation result and the noisy result is less than or equal to a threshold value and has a value of θ when the distance is greater than the threshold value.

The system applies a privacy preserving mechanism to the indicator value (608). In some implementations, the privacy preserving mechanism provides that a released indicator of 0 is always correct, but a released indicator of 1 may in reality be a 1 or 0.

The system releases the noisy result and the privacy preserved indicator value (610). The recipient can use the indicator in deciding whether to use or discard the generated result.

Determining Budget Recycling Portion of Privacy Budget

As described above with respect to FIGS. 1-3, a privacy budget for implementing differential privacy can be divided in a BR-DP framework. In particular, portions of the privacy budget are assigned to the DP kernel, e.g., DP kernel 104, and the recycling module, e.g., recycling module 106, such that the overall level of differential privacy is maintained in the output results. Additionally, the assigned budgets can also maximize or otherwise optimize the utility achieved by the results of the BR-DP framework. In this section, a determination of differential privacy leakage is described followed by techniques for assigning privacy budgets to the DP kernel and the budget recycling module that improves overall utility of the BR-DP framework.

There are several ways of evaluating differential privacy including KL divergence, total variance, Renyi divergence, hypothesis testing, etc. However, each of these different techniques for quantifying differential privacy leakage can be viewed from the perspective of a privacy loss distribution (PLD).

The privacy loss distribution can be defined as follows: For two probability distributions, P and Q, on an output domain $\mathcal{Y}$, a privacy loss random variable Z is defined as $$Z = f_{\frac{P}{Q}}(Y_n)$$

and the distribution of Z is denoted fZ(z). The function $$f_{\frac{P}{Q}}$$

is defined as $$y \to R \text{ by } f_{\frac{P}{Q}}(\mathcal{Y}_n) = \log(P(\mathcal{Y}_n)/Q(\mathcal{Y}_n)) \quad \text{Equation (5)}$$

With Z denoting the privacy loss random variable of the DP kernel's BR-DP mechanism $\mathcal{M}$, for each $\mathcal{Y}_n \in \mathcal{Y}$, Z takes values of:

$$\log\left(\frac{\mathcal{M}(X) = \mathcal{Y}_n}{\mathcal{M}(X') = \mathcal{Y}_n}\right) = \log\left(\frac{f_N(\mathcal{Y}_n \mid \mathcal{Y})}{f_N(\mathcal{Y}_n \mid \mathcal{Y} + \Delta_f)}\right) \quad \text{Equation (6)}$$

With a probability of $f_N| \mathcal{Y}_n | \mathcal{Y}$). Given Z, the privacy profile can be obtained by:

$$\delta \geq \mathbb{E}_Z[\max\{0, 1 - \exp(\epsilon - z)\}] = \int_{\epsilon}^{\infty} [1 - \exp(\epsilon - z)] f_Z(z)dz \quad \text{Equation (7)}$$

$\delta_Z(\in)$ can be used to denote δ for a given ∈, and the PLD of Z. Additionally, a variable $\tau_\mu$ represents a positive upper-utility bound and $\tau_l$ represents a negative upper-utility bound.

The probability of being within the error boundaries can be represented, at each boundary, by $p_\vartheta$ and $\overline{p}_\vartheta$, respectively. The probability of $p_\vartheta$ and $\overline{p}_\vartheta$ can be represented by a cumulative density function (CDF) of N, which is represented as Φ(·). Φ(·) depends on a variance, which further depends on the portion of the privacy budget parameters ∈y and δy allocated to the DP kernel. By denoting $\Phi_{(\in_y,\delta_y)}(\cdot)$ as the CDF of a noisy distribution given (∈y, δy), then the probabilities are:

$$p_\vartheta = \Phi_{(\epsilon_y,\delta_y)}(\tau_u) - \Phi_{(\epsilon_y,\delta_y)}(\tau_l) \quad \text{Equation (7)}$$

$$\overline{p}_\vartheta = 1 - \Phi_{(\epsilon_y,\delta_y)}(\tau_u) - \Phi_{(\epsilon_y,\delta_y)}(\tau_l) \quad \text{Equation (8)}$$

The privacy loss random variable of the PR-DP framework can be denoted as Γ. The PLD of the PR-DP framework, given the PLD of the kernel DP mechanism fz and a recycling rate q, can be used to determine a privacy profile of the BR-DP framework as:

$$\delta_\Gamma(\epsilon) \geq (1 - W)\delta_Z(\epsilon) - W\delta_Z(\epsilon - \mathcal{L}) \quad \text{Equation (9)}$$

where, $$\mathcal{L} = -\log(1 - q), \text{ and} \quad \text{Equation (10)}$$

$$W = \max\{(\Phi_{(\epsilon_y,\delta_y)}(\tau_l + \Delta_f) - \Phi_{(\epsilon_y,\delta_y)}(\tau_l)), (\Phi_{(\epsilon_y,\delta_y)}(\tau_u + \Delta_f) - \Phi_{(\epsilon_y,\delta_y)}(\tau_u))\}. \quad \text{Equation (11)}$$

The PLD of the BR-DP framework shifts the PLD of the DP kernel mechanism to the right (indicating larger privacy leakage) by $\mathcal{L}$ with probability W. Consequently, reducing or minimizing either $\mathcal{L}$ or W can help reduce the overall privacy leakage. In particular, reducing $\mathcal{L}$ may limit the increase in additional leakage while reducing W can decrease the likelihood of such leakages occurring.

The privacy profile of BR-DP depends on the privacy profile of the kernel DP mechanism, which is known. Specifically, the privacy profile of BR-DP can be derived by a linear combination of two privacy profiles of the kernel DP mechanism with different ∈ values.

With the derivation of the parameters above, an optimization algorithm can be used to find an optimal value of the recycling probability q given a particular privacy budget parameter $\in_y$. Since, as shown above, $\delta_\Gamma$ depends on $\delta_Z$, $\mathcal{L}$, and W, which further depends on kernel DP parameters and the recycling rate q, then q can be obtained when the total privacy budget (∈, δ) and the kernel DP budget (∈y, δy) are known by employing a binary search algorithm summarized below:

| Algorithm 1: Find q with binary search |
|---|
| Input: $\epsilon_y$, $\delta_y$, $\epsilon$, $\delta$, $\Delta_f$, $\vartheta$, tol. |
| Output: Optimal q. |
| Given $\epsilon_y$, $\delta_y$, $\Delta_f$, get $\Phi_{(\epsilon_y,\delta_y)}$ and $\delta_Z(\bullet)$ |
| Get $\tau_l$ and $\tau_u$ with $\vartheta$; |
| Initialize $q_{up} \leftarrow 1$, $q_{low} \leftarrow 0$; |
| $p_\vartheta \leftarrow$ (Equation 7), $\overline{p}_\vartheta \leftarrow$ (Equation 8); |
| W ← (Equation 11); |
| while $q_{up} - q_{low}$ > tol do |
| $q_{mid} \leftarrow (q_{up} + q_{low})/2$; |
| $\mathcal{L} \leftarrow$ (Equation 10); |
| $\delta_\Gamma(\epsilon) \leftarrow$ (Equation 9); |
| if $\delta_\Gamma(\epsilon) \leq \delta_{target}$ then |
| $q_{low} \leftarrow q_{mid}$; |
| else |
| $q_{up} \leftarrow q_{mid}$; |
| end if |
| end while |
| return $q_{low}$ |

Algorithm 1 uses a binary search algorithm to find the optimal value of q. For a large value of q, that means for an unacceptable Yn (i.e., the value of the generated noise exceeds the error boundary), the recycler is more likely to determine that the noise is recycled. This consequently also reduces the likelihood of non-acceptable values of Yn. Thus, in general the larger value of q the better. However, if q=1, all unacceptable values of Yn are recycled meaning that all released results are within the error boundary. However, this does not satisfy differential privacy.

Thus, the goal of Algorithm 1 is to find the largest value of q that satisfies differential privacy. The algorithm uses the binary search solution where a value of q is selected and if it is too large, it does not satisfy differential privacy, if it is too small, then there is still room to increase q, so eventually the algorithm approaches the maximum value of q that satisfies differential privacy.

However, while Algorithm 1 indicates that a larger value of q is better, it does not indicate what the best value of ∈ y is. Finding a best value of ∈ y will be described below.

The budget allocation (∈ y, δy) within the BR-DP framework for the DP kernel can also be optimized for a given total privacy budget (∈, δ). For simplicity of the calculations, in some implementations the entire δ can be allocated to the DP kernel mechanism, i.e., δ=δy, such that only ∈ y needs to be determined. However, the derivation can be extended to accommodate arbitrary selection of δy for the DP kernel mechanism. For a given (∈ y, δ), there is an acceptance rate representing the probability that the output noise value falls within the error boundaries. The acceptance rate can be expressed as:

$$\frac{\Phi_{(\epsilon_y,\delta)}(\tau_u)-\Phi_{(\epsilon_y,\delta)}(\tau_l)}{1-\Phi_{(\epsilon_y,\delta)}(\tau_u)+\Phi_{(\epsilon_y,\delta)}(\tau_l)} = \left(1-q+\frac{q}{\Phi_{(\epsilon_y,\delta)}(\tau_u)-\Phi_{(\epsilon_y,\delta)}(\tau_l)}\right)^{-1} \quad \text{Equation (12)}$$

Additionally, to improve the acceptance rate, the DP mechanism tends to minimize the objective function:

$$O[\epsilon_y, q) = 1-q+\frac{q}{\Phi_{(\epsilon_y,\delta)}(\tau_u)-\Phi_{(\epsilon_y,\delta)}(\tau_l)} \quad \text{Equation (13)}$$

Given that the value of q can be determined from ∈ y as outlined above, Equation 13 can be treated as a constrained one-dimensional optimization problem as a function of ∈ y. Various numerical methods can be used to solve this type of optimization problem. In some examples, a Ternary Search algorithm can be employed as outlined below. Ternary search efficiently pinpoints an optimal solution for objective functions that display a single peak across the support of the input variable. Additionally, the function should be monotonic both before and after this peak.

In the BR-DP context, the objective function is parameterized by ∈ y. When ∈ y is large, the dominance of the DP kernel causes the utility to be driven by it, attenuating the recycling module. Conversely, with a small ∈ y, the recycling phase takes precedence, thereby governing utility. This behavior of the objective function mirrors the characteristics suited for Ternary search.

Algorithm 2:
Find Optimal $\epsilon_y$ using Ternary Search

Input: $\epsilon$, $\delta$, $\Delta_f$, $\vartheta$, tol.
Output: Optimal $\epsilon_y$.
$\epsilon_{low} \leftarrow 0$;
$\epsilon_{up} \leftarrow \epsilon$;

-continued

Algorithm 2:
Find Optimal $\epsilon_y$ using Ternary Search while $\epsilon_{up} - \epsilon_{low} > \text{tol}$ do
$\epsilon_1 \leftarrow \epsilon_{low} + \frac{\epsilon_{up}-\epsilon_{low}}{3}$
$\epsilon_2 \leftarrow \epsilon_{up} - \frac{\epsilon_{up}-\epsilon_{low}}{3}$
$q_1 \leftarrow$ Algorithm 1 ($\epsilon_y$, $\delta_y$, $\epsilon$, $\delta$, $\Delta_f$, $\vartheta$, tol.);
$q_2 \leftarrow$ Algorithm 2 ($\epsilon_y$, $\delta_y$, $\epsilon$, $8\delta$, $\Delta_f$, $\vartheta$, tol.);
if $O(\epsilon_1, q_1) > O(\epsilon_2, q_2)$ then
$\epsilon_{low} \leftarrow \epsilon_1$;
else
$\epsilon_{up} \leftarrow \epsilon_2$;
end if
end while
$\epsilon_y \leftarrow (\epsilon_{up} + \epsilon_{low})/2$;
return $\epsilon_y$ Similar to Algorithm 1, Algorithm 2 proceeds to try values of ∈ y. If the value of ∈ y is to large, the value of ∈ y is reduced. If the value of ∈ y is too small, then the value of ∈ y is increased. In particular, for particular values of ∈ 1 and ∈ 2 corresponding values of q1 and q2 are determined using Algorithm 1 above. The combination of (∈ 1, q1) and (∈ 2, q2) are then evaluated. Eventually, the result converges on the optimal value of ∈ y.

Intuitively, to maximize utility parameters can be selected to maximize q or to maximize $p_\vartheta$. A larger ∈ y leads toa noise distribution with a small variance that increases $p_\vartheta$. Increasing q also increases utility, but diverts budget from ∈ y. Consequently, Algorithm 1 and Algorithms 2 determine a balanced distribution between the DP kernel mechanism and the recycling mechanism that enhances utility. The first algorithm is used to determine an optimal value of q given an overall privacy budget parameter ∈ and a privacy budget parameter ∈ y for the DP kernel. The second algorithm aids in determining a value of ∈ y such that the combination provides differential privacy using BR-DP at a higher utility than differential privacy alone. Taken together, the two algorithms provide a tight differential privacy analysis without relaxation of the differential privacy conditions.

Figure 7:
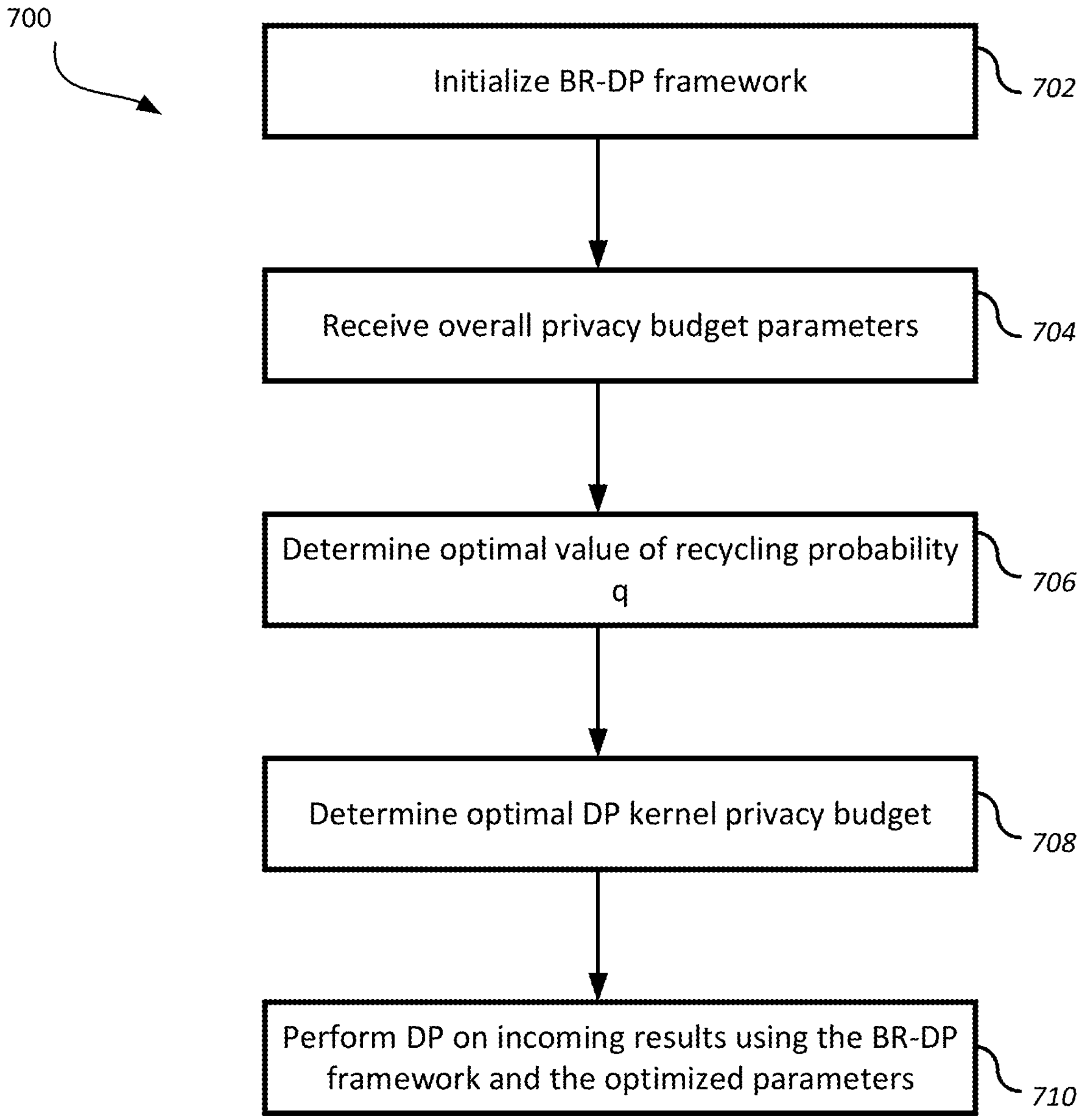
FIG. 7 is a flow diagram of an example process for determining privacy budget parameters for a BR-DP framework.

FIG. 7 is a flow diagram of an example process 700 for determining optimal privacy budget parameters for a BR-DP framework. For convenience, the process 700 will be described as being performed by a system of one or more computers, located in one or more locations, and programmed appropriately in accordance with this specification.

The system initializes the BR-DP framework (702). Initialization can occur, for example, in response to a request to perform a computation on a dataset or in response to receiving a particular computation result.

The system receives overall privacy budget parameters (704). The overall privacy budget parameters depend on a degree of privacy guarantee needed for the computation being performed on the dataset. The privacy budget parameters can change between computations or remain the same, for example, for particular categories of operations for a defined set of operations between specified parties. In the BR-DP framework, the overall privacy budget parameters will be allocated between a differential privacy mechanism and a recycling probability.

The system determines a value of a recycling probability q (706). The recycling probability can be determined as a solution to a binary search process that identifies an optimal value of the recycling probability q. For example, the solution can identify a largest q that satisfies the differential privacy constraints.

The system determines the portion of the overall privacy budget allocated to the differential privacy mechanism (708). In some implementations, the full amount of the leakage probability δ is allocated to the differential privacy mechanism such that only the value of the privacy loss parameter ∈y is determined. The value of ∈y can be determined using a Ternary search to solve an objective function parameterized by ∈y.

The system generates noisy results for incoming computation results according to the BR-DP framework and the identified recycling probability and allocated privacy budget parameters (710). For example, the noisy result can be generated as described above with respect to FIG. 3.

Composition in the BR-DP Framework

Sequential composition examines the privacy leakage for a series of independent differential privacy mechanisms applied to the same dataset, which is a critical property of privacy-preserving mechanisms. For example, for multiple instances of queries on the same dataset in which the same differential privacy mechanism is applied, e.g., the same query or different queries, the noise distribution could be evaluated to a degree that data leakage is possible. Typically, the leakage grows with the number of queries. One way to evaluate the leakage through composition of the BR-DP framework is to compare the privacy leakage between regular DP under composition and the BR-DP composition.

The composability of the BR-DP framework can be evaluated through analysis of the PLD for the BR-DP framework. Additionally, a technique for evaluating the exact privacy leakage of the BR-DP framework is provided.

As described above, the PLD of the kernel DP mechanism is fz. Similarly, the PLD of the recycling phase can be denoted fR(r), such that the total PLD for the BR-DP framework can be represented as $f_\Gamma = f_Z * f_R$. In particular, the PLD of the recycling phase can be expressed as:

$$f_R(r) = (1 - W)\delta_{Dirac}(r) + W\delta_{Dirac}(r - \mathcal{L}). \qquad (14)$$

Where $\delta_{Dirac}$ represents the Dirac function, which is a spike function such that $\delta_{Dirac}(r)=1$ if and only if r=0, otherwise $\delta_{Dirac}(r)=0$. $\mathcal{L}$, as noted above in Equation 10, is $\mathcal{L} = -\log(1-q)$ and W is as noted above in Equation 11.

A given BR-DP framework can be characterized by a PLD $f_\Gamma(\mathcal{Y})$. After T-fold compositions, the resulting PLD can be expressed as:

$$f_\Gamma^T(\mathcal{Y}) = f_\Gamma *^T f_\Gamma)(\mathcal{Y}) \qquad \text{Equation (15)}$$

Wherein $*^T$ denotes the T-fold convolution operation of the PLD. The closed-form expression of this PLD is given by:

$$\sum_{k=0}^{T} \binom{T}{k} (1 - W)^k W^{T-k} \left(f_Z *^T f_Z\right)(z - (T - k)\mathcal{L}) \qquad \text{Equation 16}$$

Based on the T-fold composition of the BR-DP framework, the privacy profile of the kernel DP mechanism after T-fold composition can be expressed as:

$$\delta_\Gamma^T(\epsilon) = \sum_{k=0}^{T} \binom{T}{k} (1 - W)^k W^{T-k} \delta_Z^T \left(\epsilon - (T - k)\mathcal{L}\right) \qquad \text{Equation 17}$$

Where $$\delta_\Gamma^T(\epsilon)$$

denotes the privacy profile of the kernel DP mechanism.

The sequential composition analysis can be integrated with other composition accounting algorithms applicable to the kernel DP mechanism. This integration results in a final expression that manifests BR-DP as a linear combination of regular DP privacy leakage accounting with specific coefficients. A detailed accounting process for this integration can be extracted from the following algorithm:

Algorithm 3:
Composition accountant for BR-DP

Input: q, $\epsilon_y$, $\delta_y$, T, $\Delta_f$, target $\epsilon$.
Output: $\delta_\Gamma^T(\epsilon)$.

$\{\tau_l, \tau_u, \tau'_l, \tau'_u\} \leftarrow \Delta_f$ and $\vartheta$;
$\Phi_{(\epsilon_y, \delta_y)}(\bullet) \leftarrow \epsilon_y, \delta_y$;
$p_\vartheta \leftarrow$ (Equation 7), $\bar{p}_\vartheta \leftarrow$ (Equation 8);
W ← (Equation 11), $\mathcal{L} \leftarrow$ (Equation 10);
$\delta_Z^T(\epsilon) \leftarrow$ privacy profile $(\epsilon_y, \delta_y, T)$ such as (Equation 17);
initialize $\delta_\Gamma^T = 0$;
for 1 ≤ k ≤ T do
$\delta' = \delta_Z^T(\epsilon - (T - k)\mathcal{L})$;
$\delta_\Gamma^T \leftarrow \delta_\Gamma^T + \binom{T}{k}(1 - W)^k W^{T-k} \delta'$;
end for
Return $\delta_\Gamma^T$ In Algorithm 3, ∈y and q are derived from Algorithm 2 and Algorithm 1, respectively. The algorithm provides tight post-composition analysis of the BR-DP framework. The algorithm is based on a linear combination of PLD of the DP kernel and the recycler, which exhibits a linear computational complexity with respect to the time of composition. The above algorithm exhibits a linear computation complexity with respect to T, denoted as $\mathcal{O}$(T).

Based on the composition accounting the privacy leakage an be evaluated for DP and BR-DP with respect to particular DP mechanisms used by the DP kernel, e.g., Gaussian or Laplacian. When compared using the same baseline parameters, the BR-DP framework reduces composed leakage as compared to DP mechanisms without recycling.

Figure 8:
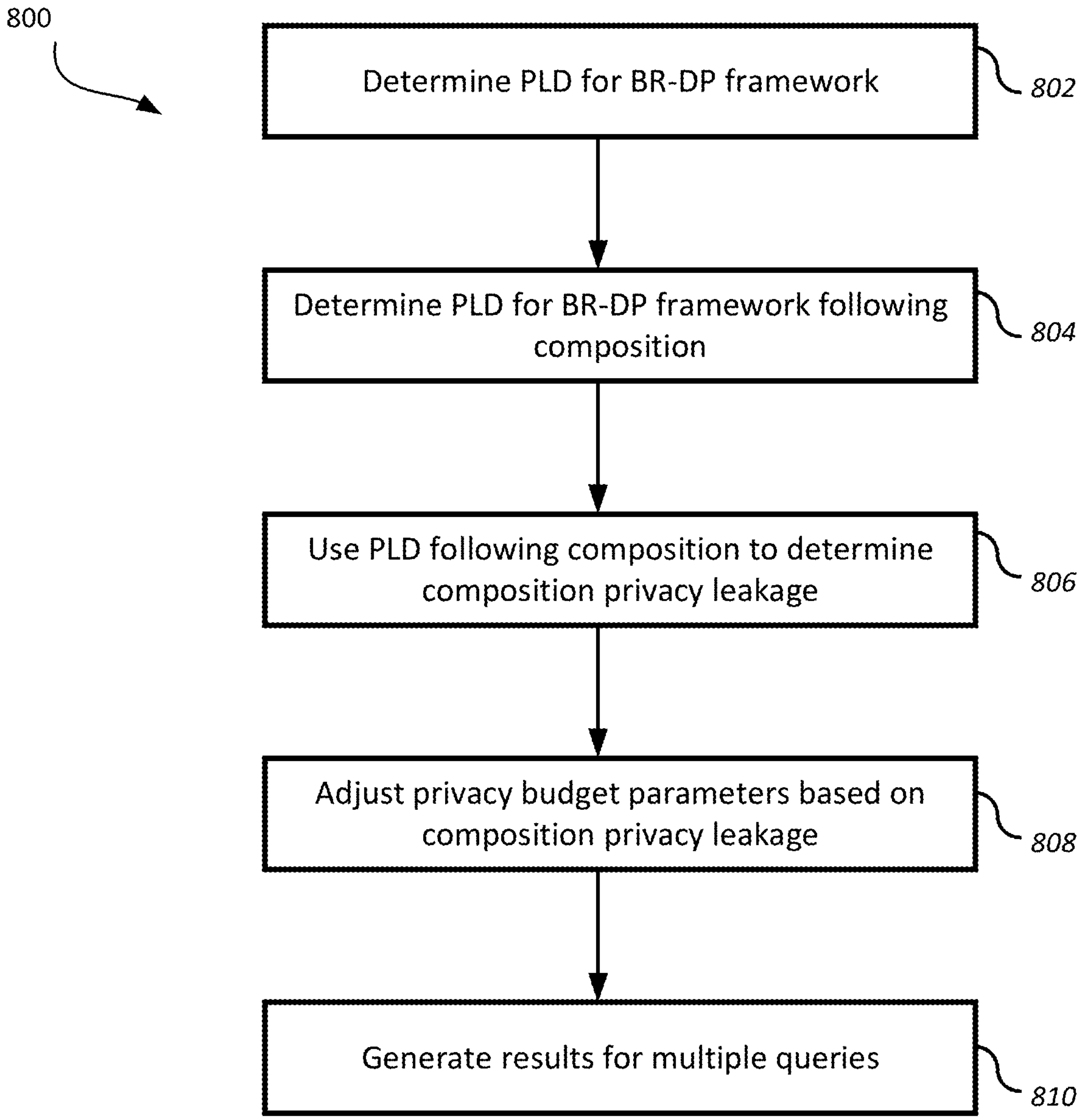
FIG. 8 is a flow diagram of an example process for determining a measure of privacy leakage under composition.

FIG. 8 is a flowchart of an example process 800 for determining a measure of privacy leakage under composition. For convenience, the process 800 will be described as being performed by a system of one or more computers, located in one or more locations, and programmed appropriately in accordance with this specification.

The system determines a PLD for the BR-DP framework (802). The PLD for the BR-DP framework is a combination of the PLD for the DP mechanism and the PLD for the recycler mechanism.

The system determines a PLD for the BR-DP framework following composition (804).

The system uses the PLD following composition to determine a privacy leakage under composition (806). For example, as shown in Algorithm 3, a privacy profile is determined that evaluates privacy leakage for particular parameters following composition.

The system can adjust privacy budget parameters based on the composition privacy leakage (810). For example, in response to determining that the BR-DP framework provides less leakage as compared to a DP mechanism under the same baseline parameters, the privacy budget may be able to be adjusted while still satisfying the differential privacy requirements.

The system can generate results for multiple queries to a dataset while maintaining a specified privacy guarantee provided by the privacy budget parameters (812). In particular, multiple noisy results can be determined in response to computation results generated from the same dataset while keeping the aggregate data leakage within the specified privacy constraints.

Subsampling for BR-DP

Privacy mechanisms such as DP and BR-DP typically require a large privacy budget to meet a specified utility threshold. However, a large privacy budget is usually not permitted under stringent privacy regulations because it may allow for a degree of privacy leakage that is unacceptable. For example, a $\epsilon$ greater than 4.5 may be needed under the BR-DP framework to generate a sufficiently high acceptance rate, e.g., 0.9. However, such a high value of $\epsilon$ may not be permitted based on applicable privacy regulations or policies.

In some implementations, the dataset being queried is very large. However, it is not necessary to run the query on the whole dataset. Instead, the query can be run on a subset of the dataset. For example, the subset can be a random sampling of the larger dataset. While there may be differences in the computation result depending on the composition of the subset, from a privacy perspective there is deniability because particular individualized data may not be in the subset. So, for example, when the data represents data about individuals, each individual has a probability of the sampling rate of being in the subset. This leads to a privacy amplification by sub-sampling. By taking a subset of the dataset there may be a similar utility of the dataset as a whole, but with greater privacy. However, it needs to be determined whether the same privacy amplification works under the BR-DP framework, and furthermore, whether there is, from a utility point of view, a sampling rate that provides the greatest utility.

This section describes the use of subsampling techniques to provide privacy amplification allowing for a larger effective privacy budget while maintaining a smaller actual privacy budget that satisfies applicable privacy concerns or regulations. In particular, these techniques provide deniability for each individual in the dataset by randomizing individual inclusion in the dataset for data aggregation, thereby enhancing privacy. In the BR-DP framework, the techniques involve starting with a small $\epsilon$ budget and amplifying it to a larger effective budget $\epsilon'$ applied to a smaller data subset. Thus, when determining a noise value using a differential privacy mechanism on a result obtained on a data subset, the privacy budget ($\epsilon'$, $\delta'$) is used instead of ($\epsilon$, $\delta$). The techniques can improve utility while adhering to the amplified $\epsilon'$. Furthermore, the amplified budget can be used in determining other differential privacy parameters described in this specification, for example the recycling probability q.

While the sampling phase amplifies data privacy, it concurrently bases subsequent processes on a subset of the raw dataset. This selective usage can inherently impact the overall data utility. For example, a higher sampling probability p typically enhances the accuracy of aggregation, yet it also necessitates the introduction of substantial noise during the perturbation phase as the privacy budget is not sufficiently amplified. As a result, the added noise in perturbation can become the predominant factor in utility degradation. Conversely, a lower p allows for the injection of lesser noise during data perturbation. In this scenario, the loss of information during the sampling phase becomes the primary source of error. This establishes a trade-off between information loss in the sampling phase and the perturbation phase. This specification further determines whether an optimal sampling probability that achieves the most favorable balance, effectively minimizing the overall error, exists.

The privacy amplification by subsampling BR-DP is based on a particular sampling rate, and in particular, a sampling that leads to the highest utility. For example, assume Xs is a random subset from dataset X such that |Xs|<|X|. For a BR-DP framework, a mechanism $\mathcal{M}^s$ is employed by a DP module according to privacy budget ($\epsilon$, $\delta$). The subsampling that takes Xs as input is based on ($\epsilon'$, $\delta'$), where $\epsilon'=\log[(e^{\epsilon}-1)p+1]$, $\delta'=p\delta$, and p=sampling rate $$\frac{X_s}{X}.$$

To determine an optimal sampling rate, the error caused by subsampling is dependent on the data distribution and the query type. The data distribution can be assumed to be a Gaussian distribution, in other words, each individual's data is sampled from the Gaussian distribution. There are also three types of query that are most common: a counting query, an average query, and a summation query. For each query type, the error in the sampling phase is represented as a random variable E, and then provided the accuracy analysis with BR-DP framework parameters. While the BR-DP framework may be assumed to be based on a Gaussian kernel DP mechanism, the techniques can be applied to other DP mechanisms such as a Laplacian DP mechanism.

An individual's data in the dataset can be denoted xi, where i indicates the individual's index in the dataset. As described above, each xi is sampled from a Gaussian distribution with mean $\mu$, and a standard deviation of $\sigma$. Additionally, $\mathcal{J}$ can be denoted as the set of user's indexed in the original dataset, $X=\{x_i\}_{i\in\mathcal{T}}$, and S as the subset of user's index in the randomly sampled dataset, $X_S=\{x_i\}_{i\in S}$. The error caused by the subsampling for different types of queries, summation, average, and counting, can be expressed, respectively, as:

$$E_{sum}=\sum_{i\in\mathcal{T}}x_i-\frac{1}{p}\sum_{i\in S}x_i,$$

$$E_{avg}=\frac{1}{|X|}\sum_{i\in\mathcal{T}}x_i-\frac{1}{|X_S|}\sum_{i\in S}x_i,$$

-continued $$E_{cnt} = \sum_{i\in\mathcal{T}} 1_{\{x_i\in C\}} - \frac{|X|}{|X_S|}\sum_{i\in S} 1_{\{x_i\in C\}}.$$

Where C denotes the subset of each individual's input support, such as $x_i$, is counted as 1 if and only if $x_i \in C$.

The random variable E for the three types of queries are zero-mean Gaussian distribution. The standard deviation for summation queries is: $\sigma_{sum}=\sigma_x\sqrt{|(X)|(1-p)/p}$. The standard deviation for averaging queries is: $\sigma_{avg}=\sigma_x\sqrt{(1-p)/(p|X|)}$. The standard deviation for counting queries is: $\sigma_{cnt}=\sqrt{|X|(1-p)p_c(1-p_c)/p}$, where $p_c=\Pr(x_i\in C)$.

For a given sampling rate p, the standard deviation for summation and counting queries increases with |X|. By contrast, the standard deviation for averaging queries decreases with |X|. Additionally, for a given |X|, the standard deviations for all three types of queries are proportional to $$\sqrt{\frac{1-p}{p}},$$

which monotonically decreases with the sampling rate p.

When combined with subsampling, the privacy-protection mechanism can be updated by appending the noise from subsampling, and the nose from the perturbation, to the raw result Y such that $Y_n=Y+E+N$, wherein E denotes the noise calibrated in the subsampling phase and N represents the noise injected by the DP kernel with an amplified privacy budget.

To find an optimal sampling rate p for a BR-DP framework with a Gaussian kernel DP, the acceptance rate for noisy results is updated to:

$$O[\epsilon_y, q, p) = 1 - q + \frac{q}{\Phi_\sigma(\tau_u) - \Phi_\sigma(\tau_l)}, \quad \text{Equation (18)}$$

Where $\Phi_\sigma$ corresponds to the CDF of a particular Gaussian distribution with $$\sigma = \sqrt{(\sigma_y^2 + \sigma_\epsilon^2)}.$$

The algorithm below illustrates a technique for obtaining the optimal parameters of $\in_y$, q, and p.

Algorithm 4:
Find Optimal p for Subsampled BR-DP with Gaussian Kernel

Input: $\epsilon$, $\delta$, $\Delta_f$, N, $\sigma_x$, tol.
Output: p.
$p_{low} \leftarrow 0$;
$p_{up} \leftarrow 1$;
while $p_{up} - p_{low} >$ tol do
$p_1 \leftarrow p_{low} + \frac{p_{up} - p_{low}}{3}$;
$p_2 \leftarrow p_{low} - \frac{p_{up} - p_{low}}{3}$;
$\epsilon_1, \delta_1$ $(\epsilon_2, \delta_2)$ $\leftarrow$ privacy amplification $\epsilon'$ above with $p_1$ $(p_2)$;
calibrate $\epsilon_1, \delta_1$ $(\epsilon_2, \delta_2)$ to $\epsilon'_1$, $\delta(\epsilon'_2, \delta)$;
$\sigma_{\epsilon 1}(\sigma_{\epsilon 1}) \leftarrow$ (Equation 18) with $p_1$ $(p_2)$;

-continued

Algorithm 4:
Find Optimal p for Subsampled BR-DP with Gaussian Kernel $\epsilon_{y1}(\epsilon_{y2}) \leftarrow$ Algorithm 2 with $\epsilon_1, \delta_1$ $(\epsilon_2, \delta_2)$, O $\leftarrow$ (Equation 18)
q1 (q2) $\leftarrow$ Algorithm 1 with $\epsilon_1, \delta_1$ $(\epsilon_2, \delta_2)$;
if $O(\epsilon_{y1}, q_1, p_1) > O(\epsilon_{y2}, q_2, p_2)$then
$p_{low} \leftarrow p_1$;
else
$p_{up} \leftarrow p_2$;
end if
end while
$p \leftarrow (p_{up} + P_{low})/2$;
return p Where the algorithms Algo. 1 and Algo 2 were provided above. Algorithm 4, essentially finds the tradeoff between utility and noise. If p is too large, then the noise is too great. If p is too small then both error types are too great. The algorithm iterates to converge on the optimal value of p.

The optimal sampling rate p depends on the particular query. For example, for a summation query, the optimal sampling rate may be high to reduce subsampling noise. By contrast, the optimal sampling rate for an averaging query may be lower because the variance of the standard deviation is small for large datasets. Further, the optimal sampling rate for counting queries may vary with the dataset size.

The above provides a unique expression of utility for different types of queries after subsampling. Moreover, the above technique considers utility in determining the optimal subsampling rate. The use of subsampling in the BR-DP framework may increase utility as compared to subsampling in regular DP.

Figure 9:
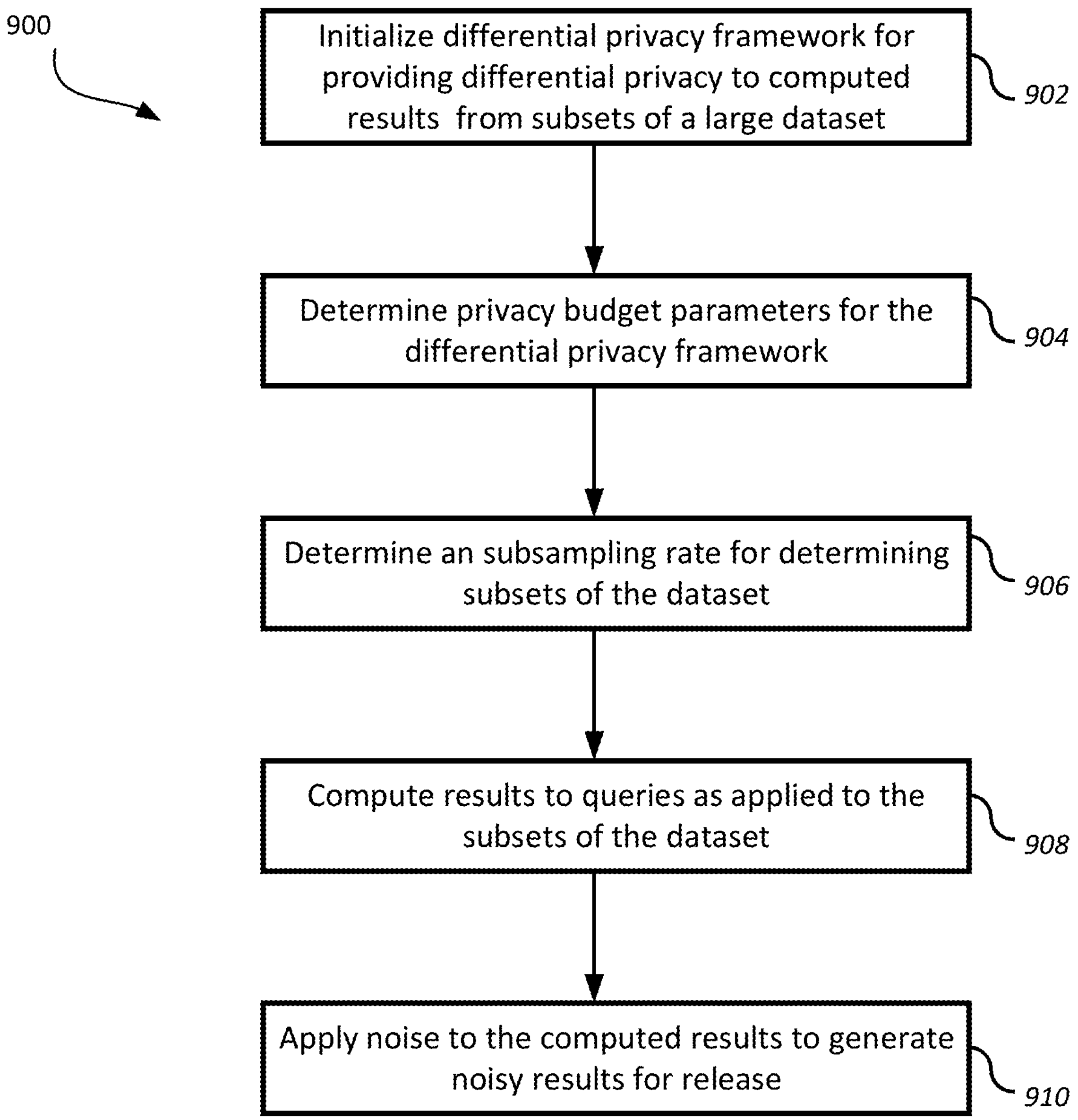
FIG. 9 is a flow diagram of an example process for applying differential privacy to large datasets with subsampling.

FIG. 9 is a flowchart of an example process 900 for determining optimal no privacy budget parameters for a BR-DP framework. For convenience, the process 900 will be described as being performed by a system of one or more computers, located in one or more locations, and programmed appropriately in accordance with this specification.

The system initializes a differential privacy protecting system for providing differential privacy to computed results from subsets of a large dataset (902). For each computed result, noise is added to the result to provide a released noisy result that satisfies privacy requirements.

The system determines privacy budget parameters (904). The privacy budget parameters ($\in$, $\delta$) can be determined based on particular privacy and utility requirements. In some implementations, they are determined based on a BR-DP framework in which q and $\in$y are determined, for example, as described above with respect to algorithms 1 and 2.

The system determines a sampling rate for determining subsets of the dataset (906). The sampling rate can be based on a tradeoff between the amplified utility from subsampling and the introduced subsampling noise.

The system computes results to queries as applied to subsets of the dataset according to the sampling rate (908).

The system applies noise to the computed results to generate noisy results for release (910). The noisy results can be generated according to a BR-DP framework. In particular, the differential privacy and budget recycling parameters used are determined based on the amplified privacy budget.

The BR-DP framework can be employed to increase utility as compared to differential privacy alone. The utility can be further enhanced by use of a utility indicator and by selecting particular privacy parameters based on the effect on utility. Such a framework can be used in any suitable system for which regular differential privacy is employed. For example, two entities may wish to compute functions based on large datasets of information. For example, one entity may be a social media entity with a large dataset of information relating to social media content or users. The second entity may be a content sponsor for the social media entity, an academic institution, or other entity. The social media entity needs to maintain the privacy of their dataset such that individualized information, e.g., about a particular user, cannot be obtained by the second entity. The computed functions on the datasets can have noised added according to the BR-DP framework, which allows the two entities to perform data analysis as part of evaluating various functions without providing any access to the private data outside of the respective entities and ensuring within the specified degree of differential privacy that the outputs cannot identify any individualized information from the datasets.

Figure 10:
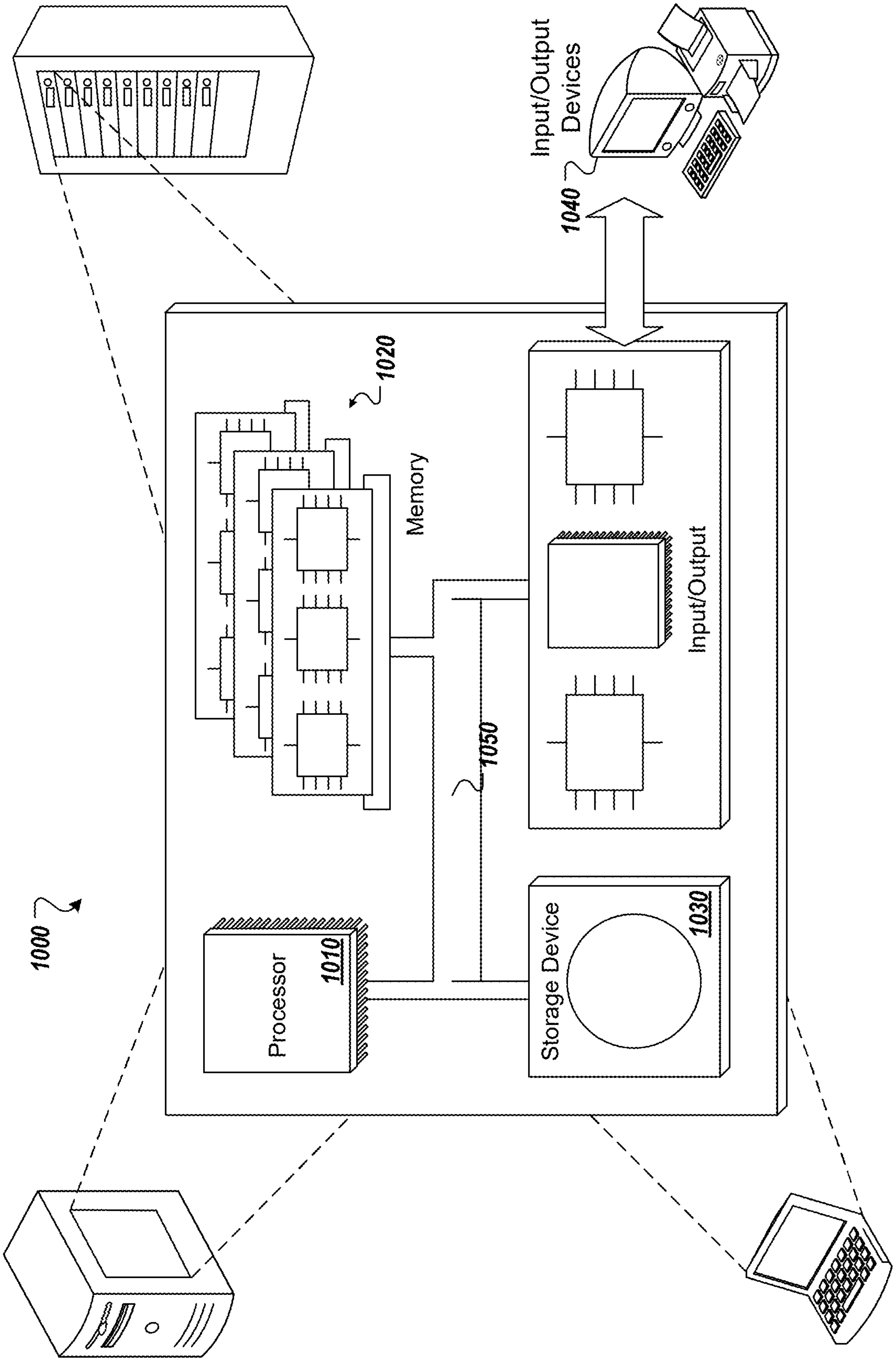
FIG. 10 illustrates a schematic diagram of an example computing system.

FIG. 10 illustrates a schematic diagram of an example computing system 1000. The system 1000 can be used for the operations described in association with the implementations described herein. For example, the system 1000 may be included in computing devices of the one or more online components and/or the one or more offline components. The system 000 includes a processor 1010, a memory 020, a storage device 1030, and an input/output device 1040. The components 1010, 1020, 1030, and 1040 are interconnected using a system bus 1050. The processor 1010 is capable of processing instructions for execution within the system 1000. In some implementations, the processor 1010 is a single-threaded processor. The processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. The memory 1020 can be a volatile memory unit or a non-volatile memory unit. The storage device 1030 is capable of providing mass storage for the system 1000. The storage device 1030 is a computer-readable medium. The storage device 1030 may be a floppy disk device, a hard disk device, an optical disk device, or a tape device. The input/output device 1040 provides input/output operations for the system 1000. The input/output device 1040 includes a keyboard and/or pointing device. The input/output device 1040 includes a display unit for displaying graphical user interfaces.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following embodiments are also innovative:

Embodiment 1 is a method, the method comprising: responsive to a computation result, generating a random noise value according to particular differential privacy parameters; generating a noisy result by combining the computation result with the generated random noise value; determining a utility indicator value based on a distance between the noisy result and the computation result; and releasing the noisy result along with the utility indicator value.

Embodiment 2 is the method of embodiment 1, wherein the distance represents one of an absolute distance or a relative distance between the noisy result and the computation result.

Embodiment 3 is the method of any one of embodiments 1 through 2, wherein the utility indicator value is binary.

Embodiment 4 is the method of any one of embodiments 1 through 3, wherein the utility indicator has a first value if the distance satisfies a threshold value and a second value otherwise.

Embodiment 5 is the method of any one of embodiments 1 through 4, wherein the noisy result is labeled as usable if the corresponding utility indicator has the first value and the noisy result is labeled as non-usable if the corresponding utility indicator has the second value.

Embodiment 6 is the method of any one of embodiments 1 through 5, the method further comprising applying a privacy preserving mechanism to the utility indicator value before release.

Embodiment 7 is the method of any one of embodiments 1 through 6, wherein the privacy preserving mechanism is applied such that for a given released first value there is a probability that the real utility indicator value is the second value.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method comprising:

determining a privacy loss distribution for a budget recycling-differential privacy (BR-DP) framework for providing differential privacy to computed results generated from a dataset, wherein the BR-DP framework comprises generating a random noise value for a computed result, determining whether the random noise value satisfies an error boundary, and recycling the random noise value by generating a new random noise value in response to determining that the random noise value does not satisfy the error boundary;

determining a privacy loss distribution for the BR-DP framework following T-fold composition of computed results on the dataset;

using the privacy loss distribution for the BR-DP framework following T-fold composition to determine a privacy leakage of the BR-DP framework under composition; and adjusting one or more privacy parameters of the BR-DP framework based on the determined privacy leakage, wherein adjusting the one or more privacy parameters comprises adjusting a recycling probability that indicates a probability of recycling the random noise value when the random noise value does not satisfy the error boundary.

2. The method of claim 1, further comprising:

generating multiple computed results in response to respective queries applied to the dataset; and applying differential privacy to each of the multiple computed results according to the BR-DP framework.

3. The method of claim 1, wherein T-fold composition corresponds to T independent instances of queries on the dataset for which a same differential privacy mechanism is applied to respective computed results.

4. The method of claim 1, wherein determining a privacy leakage comprises determining a privacy profile of differential privacy mechanism after composition.

5. The method of claim 1, wherein the privacy loss distribution for the BR-DP framework is a combination of a privacy loss distribution for a differential privacy mechanism and a privacy loss distribution for a recycler mechanism.

6. The method of claim 5, wherein the combination comprises a linear combination of differential privacy leakage accounting with specific coefficients.

7. A system comprising:

a user device; and one or more computers configured to interact with the user device and to perform operations comprising:

determining a privacy loss distribution for a budget recycling-differential privacy (BR-DP) framework for providing differential privacy to computed results generated from a dataset, wherein the BR-DP framework comprises generating a random noise value for a computed result, determining whether the random noise value satisfies an error boundary, and recycling the random noise value by generating a new random noise value in response to determining that the random noise value does not satisfy the error boundary;

determining a privacy loss distribution for the BR-DP framework following T-fold composition of computed results on the dataset;

using the privacy loss distribution for the BR-DP framework following T-fold composition to determine a privacy leakage of the BR-DP framework under composition; and adjusting one or more privacy parameters of the BR-DP framework based on the determined privacy leakage, wherein adjusting the one or more privacy parameters comprises adjusting a recycling probability that indicates a probability of recycling the random noise value when the random noise value does not satisfy the error boundary.

8. The system of claim 7, further comprising:

generating multiple computed results in response to respective queries applied to the dataset; and applying differential privacy to each of the multiple computed results according to the BR-DP framework.

9. The system of claim 7, wherein T-fold composition corresponds to T independent instances of queries on the dataset for which a same differential privacy mechanism is applied to respective computed results.

10. The system of claim 7, wherein determining a privacy leakage comprises determining a privacy profile of differential privacy mechanism after composition.

11. The system of claim 7, wherein the privacy loss distribution for the BR-DP framework is a combination of a privacy loss distribution for a differential privacy mechanism and a privacy loss distribution for a recycler mechanism.

12. The system of claim 11, wherein the combination comprises a linear combination of differential privacy leakage accounting with specific coefficients.

13. One or more computer-readable storage media encoded with instructions that, when executed by one or more computers, cause the one or more computers to perform operations comprising:

determining a privacy loss distribution for a budget recycling-differential privacy (BR-DP) framework for providing differential privacy to computed results generated from a dataset, wherein the BR-DP framework comprises generating a random noise value for a computed result, determining whether the random noise value satisfies an error boundary, and recycling the random noise value by generating a new random noise value in response to determining that the random noise value does not satisfy the error boundary;

determining a privacy loss distribution for the BR-DP framework following T-fold composition of computed results on the dataset;

using the privacy loss distribution for the BR-DP framework following T-fold composition to determine a privacy leakage of the BR-DP framework under composition; and adjusting one or more privacy parameters of the BR-DP framework based on the determined privacy leakage, wherein adjusting the one or more privacy parameters comprises adjusting a recycling probability that indicates a probability of recycling the random noise value when the random noise value does not satisfy the error boundary.

14. The computer-readable storage media of claim 13, further comprising:

generating multiple computed results in response to respective queries applied to the dataset; and applying differential privacy to each of the multiple computed results according to the BR-DP framework.

15. The computer-readable storage media of claim 13, wherein T-fold composition corresponds to T independent instances of queries on the dataset for which a same differential privacy mechanism is applied to respective computed results.

16. The computer-readable storage media of claim 13, wherein determining a privacy leakage comprises determining a privacy profile of differential privacy mechanism after composition.

17. The computer-readable storage media of claim 13, wherein the privacy loss distribution for the BR-DP framework is a combination of a privacy loss distribution for a differential privacy mechanism and a privacy loss distribution for a recycler mechanism.

18. The computer-readable storage media of claim 17, wherein the combination comprises a linear combination of differential privacy leakage accounting with specific coefficients.

* * * * *